(12) United States Patent
Eckermann

(10) Patent No.: US 10,057,099 B1
(45) Date of Patent: Aug. 21, 2018

(54) SYSTEM AND METHOD FOR COMMUNICATING WRITE STREAM DATA SYMBOLS

(71) Applicant: NXP USA, INC., Austin, TX (US)

(72) Inventor: Benjamin Charles Eckermann, Bee Caves, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/438,250

(22) Filed: Feb. 21, 2017

(51) Int. Cl.
| | |
|---|---|
| *H04L 27/26* | (2006.01) |
| *H04B 1/16* | (2006.01) |
| *H04B 1/04* | (2006.01) |
| *H04L 1/00* | (2006.01) |
| *H04L 7/04* | (2006.01) |

(52) U.S. Cl.
CPC .......... *H04L 27/2605* (2013.01); *H04B 1/04* (2013.01); *H04B 1/16* (2013.01); *H04L 1/0057* (2013.01); *H04L 1/0079* (2013.01); *H04L 1/0083* (2013.01); *H04L 2007/045* (2013.01)

(58) Field of Classification Search
CPC ... H04L 1/0057; H04L 1/0079; H04L 1/0083; H04L 2007/045
See application file for complete search history.

(56) References Cited

U.S. PATENT DOCUMENTS

| | | | | |
|---|---|---|---|---|
| 7,583,627 B2* | 9/2009 | Hirsch | ................. | H04L 1/0083 370/320 |
| 8,275,080 B2* | 9/2012 | Jordan | .................. | H04B 1/707 375/354 |
| 8,838,822 B2* | 9/2014 | Spalla | .................. | H04L 1/0057 370/395.64 |

OTHER PUBLICATIONS

Microsemi Corporation, "Implementing SpaceWire Clock and Data Recovery in RTG4 FPGAs", https://www.microsemi.com/document-portal/doc_view/135526-ac444-implementing-spacewire-clock-and-data-recovery-in-rtg4-fpga-application-note, Mar. 2016, pp. 1-22.
Compaq Computer Corporation, "Universal Serial Bus Specification 2.0", http://sdphca.ucsd.edu/Lab_Equip_Manuals/usb_20.pdf, Apr. 27, 2000, chapters 6-7.
RapidIO Trade Association, "RapidIO Interconnect Specification Part 6: 1x/4x LP-Serial Physical Layer Specification", http://www.rapidio.org/files/serial_book.pdf, Revision 1.3, Jun. 2005, 172 pages.
ECSS, "Space Engineering—SpaceWire—Links, nodes, routers and networks" http://spacewire.esa.int/content/Standard/ECSS-E50-12A.php, Jul. 31, 2008, 129 pages.

* cited by examiner

*Primary Examiner* — Ross Varndell

(57) ABSTRACT

A radio transmitter includes a data source, and write stream circuitry coupled to the data source. When a write stream mode is enabled and when there is valid write stream data available from the data source, the write stream circuitry is configured to transmit one or more write stream data symbols to a receiver. When there is no valid write stream data available from the data source, one or more idle symbols are transmitted to the receiver. Each of the idle symbols is randomly selected from a set of at least two idle symbols.

20 Claims, 3 Drawing Sheets

SYSTEM AND METHOD FOR COMMUNICATING WRITE STREAM DATA SYMBOLS

BACKGROUND

Field

This disclosure relates generally to communicating data, and more specifically, to a system and method for communicating write stream data symbols.

Related Art

Some bi-directional communication protocols in use today communicate symbols between a transmitter and a receiver in which the clock is recovered from the communicated data. For example, a radio frequency (RF) transmitter may communicate symbols with a baseband receiver using such a communication protocol. In these protocols, the communicated symbols include both data symbols and control symbols, in which each symbol includes a predetermined number of bit values, depending on the encoding used. Typically in such communication systems, there is limited bandwidth These communication protocols should support both read and write operations and maintain high-efficiency data throughput operation without introducing significant narrow-band noise into the system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

According to one aspect, a transmitter is capable of operating in a write stream mode in which a write stream is generated and transmitted to a receiver in accordance with a communication protocol. A write stream is a non-ending stream of write stream data symbols sent by the transmitter, without sending header information or address information with the write stream. The write stream can be intermixed with non-write stream symbols and with sequences of one or more pseudo-randomly selected idle control symbols. For example, when a write stream symbol or non-write stream symbol is not available to transmit to the receiver, the transmitter may transmit the idle control symbols. By using a pseudo-randomly selected sequence of idle control symbols rather than a same fixed idle control symbol, narrow-band noise may be reduced.

Figure 1:
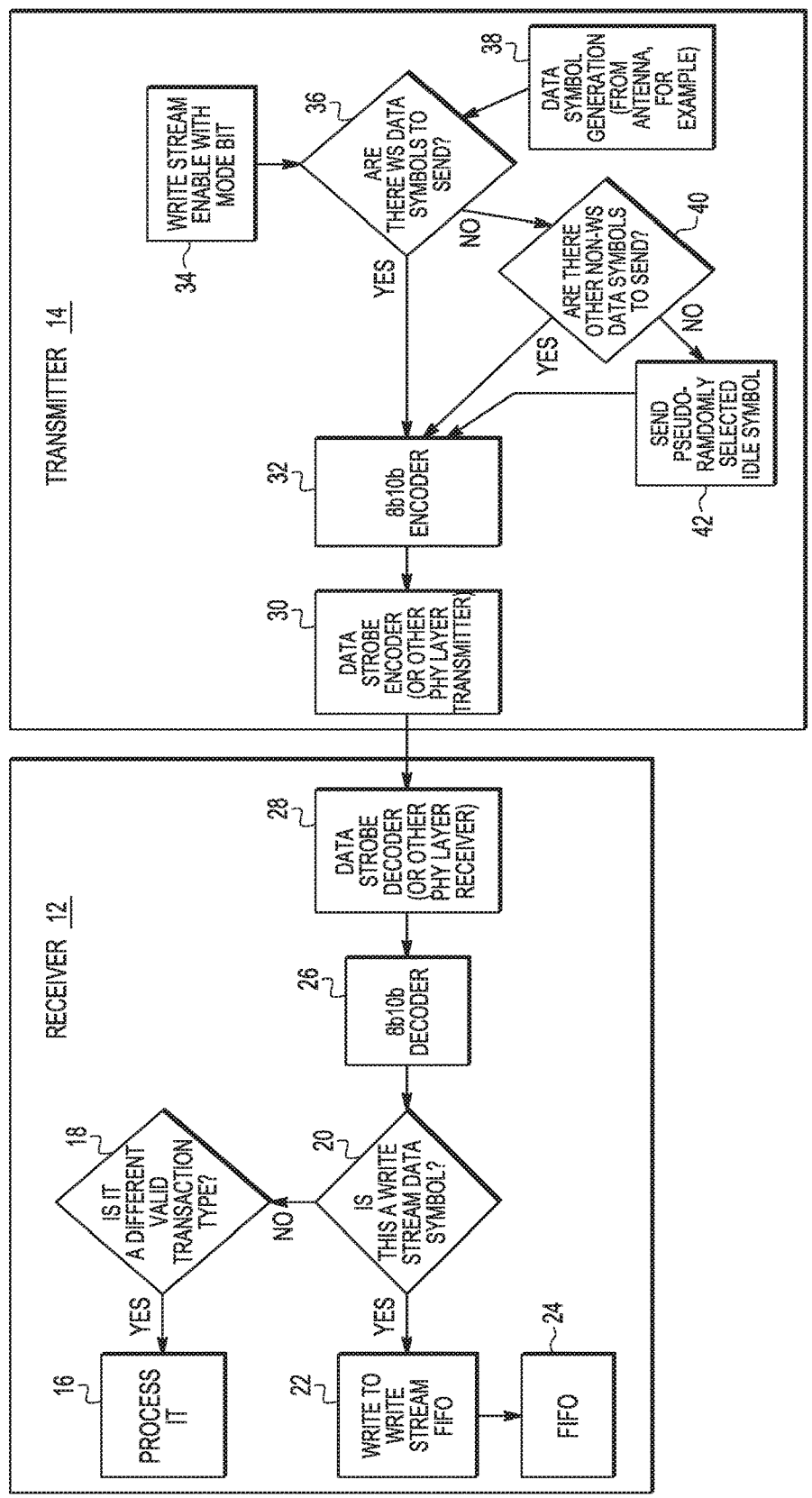
FIG. 1 illustrates a partial block diagram and a partial data flow diagram of a communication system including a transmitter and receiver, in accordance with one embodiment of the present invention.

FIG. 1 illustrates a partial block diagram and a partial data flow diagram of a communication system 10 including a transmitter 14 and receiver 12, in accordance with one embodiment of the present invention. In one embodiment, transmitter 14 may be an RF transmitter and therefore part of an RF integrated circuit (IC), and receiver 12 may be a baseband receiver and therefore part of a baseband IC. In the illustrated embodiment, the communication protocol used by system 10 communicates symbols with an 8b10b encoding. The symbols include both control symbols and data symbols. Although the descriptions herein will assume 8b10b encoding, alternate embodiments may use other encodings, such as 64b66b encoding.

In 8b10b encoding, the transmitter generates 8-bit words of valid data which are then encoded into a 10-bit entity in accordance with 8b10b encoding. The 10-bit entity maps the 8-bit words into a 10-bit symbol, for example, to balance the 1's and 0's that are transmitted and minimize the maximum length of constant 1's and 0's. Therefore, each data symbol is transmitted as a 10-bit entity to the receiver. The control symbols include commands within the communication protocol. The transmitter also transmits the control symbols as 10-bit entities, and each control symbol may be one symbol of a fixed set of predetermined symbols, as defined by the communication protocol. In addition to control symbols and data symbols, the transmitted symbols may also include invalid symbols.

For example, in one embodiment, the communication protocol includes a total of $2^{10}$, or 1024, possible symbols (due to the symbols being 10-bit entities). The protocol defines 12 different control symbols and $2^8$ data symbols (due to being 8-bit words of valid data). The remaining 756 symbols are invalid symbols (i.e. $2^{10}$ total symbols—$2^8$ data symbols—12 control symbols). Note that the 10-bit entity control symbols are mutually exclusive of the 10-bit entity data symbols, such that a receiver can differentiate between a data symbol and a control symbol (and also an invalid symbol).

Figure 2:
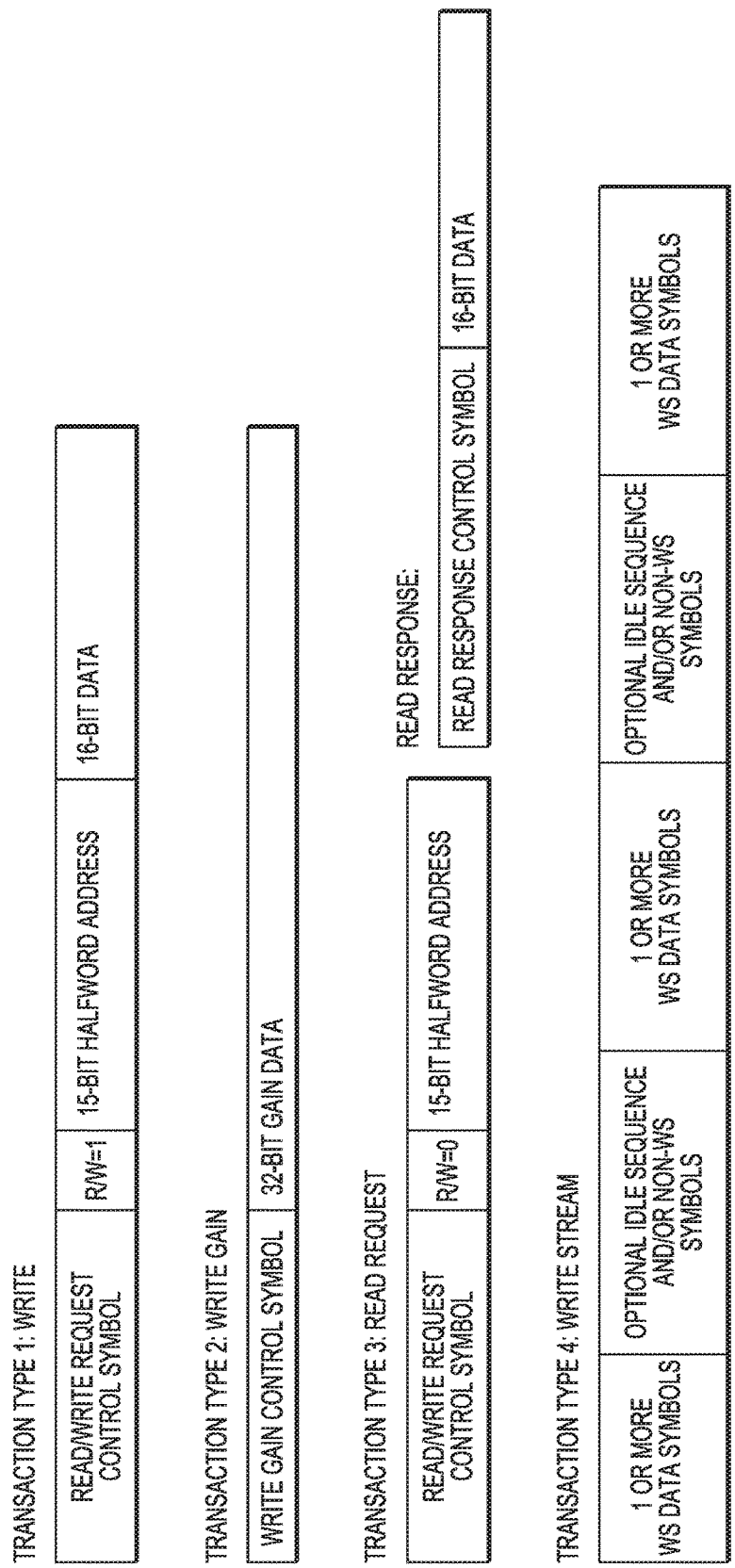
FIG. 2 illustrates, in diagrammatic form, various transaction types which may be used by a communication protocol of the communication system of FIG. 1, in accordance with one embodiment of the present invention.

FIG. 2 illustrates 4 example transaction types used in the communication protocol of system 10. The first transaction type is Write. A Write Transaction communicates a read/write request control symbol, a R/W indicator bit set to 1 to indicate a write, a 15-bit halfword address, and a 16-bit data value. For example, a Write Transaction can be sent from receiver 12 to transmitter 14 to write the 16-bit value to the halfword location. A second transaction type is a Write Gain. A Write Gain is a fast write to a special predetermined address. A Write Gain Transaction communicates a write gain control symbol and a 32-bit gain data value. For example, this Write Gain Transaction can be sent by receiver 12 to transmitter 14 to write the 32-bit gain data value to a predetermined address in the transmitter. Since a Write Gain Transaction is written to a predetermined address, no address information needs to be sent.

A third transaction type is Read. A Read Transaction communications the read/write request control symbol, a R/W indicator bit cleared to 0 to indicate a read, and a 15-bit halfword address. For example, a Read Transaction can be sent to transmitter 14 requesting data. A Read Transaction includes a read request followed by a read response. For the read response of the Read Transaction, transmitter 14 can send back to receiver 12 a read response control symbol followed by a 16-bit data value that can then be stored by receiver 12 at the halfword location. Note that the Write Transaction, Write Gain Transaction, the read request of a Read Transaction, and the read response of a Read Transaction are each provided as a series of indivisible or uninterruptable symbols.

A fourth transaction type is Write Stream. There is no special command to indicate a Write Stream Transaction. That is, with a Write Stream Transaction, no control symbol is communicated to indicate a Write Stream and no address information is communicated either. When performing a Write Stream Transaction, transmitter 14 is placed into Write Stream mode in which write streams are transmitted. For example, this may be done by receiver 12 by setting a write stream mode bit in transmitter 14. A write stream (WS) is a non-ending symbol stream in that it has no ending until write stream mode is exited or disabled, such as by clearing the write stream mode bit. A write stream includes WS data symbols which can be intermixed with idle sequences of one or more idle symbols and non-WS symbols. An idle sequence is a series of one or more pseudo randomly selected control symbols (referred to as idle symbols) which are selected from a subset of N control symbols, in which N is greater than or equal to 2 and less than the complete set of control symbols of the protocol. In one embodiment, N=3 in which the idle sequences within a WS are pseudo random sequences made from only 3 different control symbols. In write stream mode, non-WS symbols may also be intermixed with the WS and transmitted to receiver 12. These non-WS symbols may include a non-idle sequence control symbol (a control symbol which is not one of the N control symbols) followed immediately by Y data symbols in which Y is greater than or equal to 0 and determined by the specific control symbol. Therefore, in write stream mode, any symbol transmitted by transmitter 14 that is not an idle symbol nor a non-WS symbol, is interpreted by receiver 12 as a WS data symbol. Write Stream Transactions will be described in further detail with respect to FIGS. 1 and 3.

Referring to FIG. 1, transmitter 14 includes storage circuitry configured to store a write stream mode bit 34, a data generator circuitry 38, 8b10b encoder circuitry 32, and data strobe encoder circuitry 30. Transmitter 14 also includes write stream circuitry to perform the data flow portion, including the functions of decision diamonds 36 and 40 and block 42. This circuitry may be referred to as write stream circuitry. If transmitter 14 is operating in write stream mode, then write stream mode bit 34 is set (in which this bit can be set by receiver 12). Data generator 38 generates data symbols to be sent in a Write Stream Transaction. For example, in the case in which transmitter 14 is an RF transmitter, data generator 38 may generate data symbols using Received Signal Strength Indicator (RSSI) data from an antenna of the RF transmitter. In one embodiment, data generator 38 stores data symbols to be sent in first-in first-out (FIFO) storage circuitry. At decision diamond 36, it is determined if there are any write stream data symbols to send from data generator 38. If there are data symbols to send, the data symbols are provided to encoder 32 so that they may be encoded in accordance with 8b10b encoding to generate WS data symbols. The WS data symbols are provided to data strobe encoder 30 which is a physical layer encoder which encodes strobe information with the WS data symbols before transmission to receiver 12. This allows receiver 12 to determine clock information from the transmitted data. In alternate embodiments, other encodings may be used in place of 8b10b encoding. Also, in alternate embodiments, data strobe encoder 30 may be replaced with a different physical layer transmitter.

Referring back to decision diamond 36, if no data is available to send from data generator 38, it is determined if there are any non-WS symbols to send at decision diamond 40. If so, these non-WS symbols are provided to encoder 32 so that they may be encoded in accordance with 8b10b encoding. As described above, these non-WS symbols may include a control symbol that is not part of the predetermined subset used to generate idle sequences and 0 or more immediately following data symbols. For example, non-WS symbols may include a Read Response Control Symbol followed by Y response data symbols. If there are no WS data symbols at diamond 36 to send and no non-WS symbols to send, then at block 72 a pseudo random idle symbol is sent. The idle symbol is pseudo randomly selected from the subset of N control symbols. In one embodiment, a seed value is used for a random number generator which may be used to select an idle symbol from the subset of N control symbols. In one embodiment, each idle symbol that immediately follows a WS data symbol or a non-WS symbol is the same idle symbol, such that each pseudo-random idle sequence begins with the same control symbol. Alternatively, every idle symbol, including one immediately following a WS data symbol or non-WS symbol, is pseudo randomly selected. The idle symbol is provided to encoder 32 so that it may be encoded in accordance with 8b10b encoding to generate an encoded idle symbol. The non-WS symbols and idle symbols, after encoding by encoder 32, are provided to encoder 30 for physical layer encoding prior to transmission to receiver 12. An example WS will be provided with respect to FIG. 3 below.

Still referring to FIG. 1, receiver 12 includes storage circuitry which implements a first-in first-out (FIFO) data structure 24, 8b10b decoder circuitry 26, and data strobe decoder circuitry 28. Receiver 12 also includes receiver circuitry to perform the data flow portion, including the functions of decision diamonds 18 and 20 and blocks 16 and 22. Receiver 12 receives symbols at data strobe decoder 28. Data strobe decoder 28 is able to recover clock information from the received symbols. The received symbols are then provided to decoder 26 which decodes the symbols according to 8b10b decoding. In alternate embodiments, receiver 12 may use other decoders in place of the 8b10b decoder to match the encoder used in transmitter 12 and other physical layer receivers may be used in place of data strobe decoder 28. Also, in one embodiment, it is assumed that decoder 28 or decoder 26 removes invalid data symbols such that no symbols received from decoder 26 are invalid data symbols.

At decision diamond 20, receiver 12 determines whether a received symbol is a WS data symbol or not. Since transmitter 14 is in write stream mode, receiver 12 can determined if the received symbol is a WS data symbol by comparing it against the control symbols. If the received symbol is one of the N control symbols used to generate an idle sequence, then receiver 12 determines that it is an idle symbol and need not store it or further process it. If the received symbol is one of the remaining control symbols, then receiver 12, at decision diamond 18, determines if the received control symbol corresponds to a valid transaction type, and if so, proceeds to process it accordingly at block 16. If, at decision diamond 20, receiver 12 determines that the received symbol is not a control symbol, then it is assumed to be a valid WS data symbol and it is stored, at block 22, in FIFO 24. Note that the WS data symbols are stored in FIFO 24 in which no address information is provided with the WS data symbols.

Figure 3:
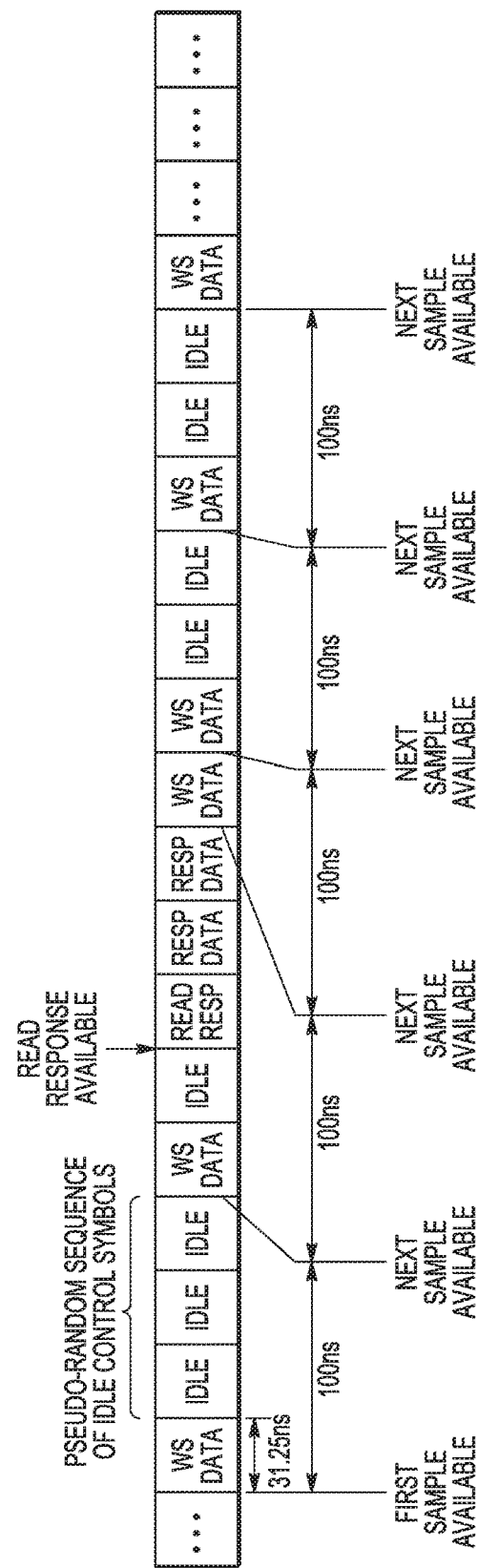
FIG. 3 illustrates, in diagrammatic form, an example of a write stream which may be communicated from the transmitter to the receiver of FIG. 1, in accordance with one embodiment of the present invention.

FIG. 3 illustrates, in diagrammatic form, an example of a write stream which may be communicated from the receiver to the transmitter 14 to receiver 12. In the illustrated example, it is assumed that transmitter 14 is an RF transmitter that generates 8 bits of write stream data to transmit every 100 ns. Therefore, every 100 ns, data generator 38 has a next 8-bit data sample available. In one embodiment, each 8-bit data sample is RSSI data. In the illustrated example, it is assumed that receiver 12 is a baseband IC and the interface from transmitter 14 to receiver 12 operates at 320 Msps. Assuming 8b10b encoding, this corresponds to 32 M symbols/second, or a 31.25 ns symbol period. That is, transmitter 14 is able to transmit a symbol to receiver 12 every 31.25 ns, which is a faster rate than the rate at which data generator 38 generates samples.

In the illustrated embodiment, transmitter 14 is operating in write stream mode. A first sample is available by generator 38, so transmitter 14 (after the proper encodings) transmits a WS data symbol to receiver 12. Note that no header information or control symbol was sent to receiver 12 prior to the first WS data symbol. Also note that no address information is sent with the WS data symbol. After 31.25 ns, transmitter 14 is capable of transmitting a next symbol, however, data generator 38 does not yet have a next sample available. Also, at this time, there is no other non-WS symbols available to send. Therefore, transmitter 14 sends an idle symbol in which the idle symbol is pseudo randomly selected from the set of N control symbols. Since a next data sample from generator 38 is not available until 100 ns after the first sample, transmitter continues to send two more idle symbols. After the third idle symbol, a next sample is available from generator 38, and is transmitted to receiver 12. Therefore, between the first WS data symbol and the second WS data symbol, transmitter 14 is able to send out an idle sequence of three pseudo-randomly selected idle symbols. Note that this helps achieve the desired data rate.

After the second WS data symbol is transmitted, there is no available sample yet from generator 38 and there is no non-WS symbols to send, therefore, transmitter 14 sends another idle symbol. After this idle symbol is transmitted, though, non-WS symbols are sent as there is a Read Response ready to send. Therefore, transmitter 14 sends a Read Response control symbol followed immediately by two response data symbols. Note that a Read Response cannot be interrupted or divided, therefore, it must finish before a next WS symbol is sent. After the response data symbols are transmitted, though, a next sample is available from generator 38 and a next WS data symbol is transmitted. Due to the intervening read response transaction during the write stream, another sample is available immediately after sending the previous WS data symbol. Therefore, a next WS data symbol is sent immediately following the previous WS data symbol. The write stream continues with transmitter 14 sending WS data symbols, as they become available, and non-WS symbols, as they become available. When neither is available, transmitter 14 sends a pseudo randomly selected idle symbol. The write stream transaction continues until write mode is exited, such as by clearing write mode bit 34.

The ability of transmitter 14 to transmit sequences of pseudo randomly selected idle symbols when operating in write stream mode avoids generating narrow-band noise such as that which would be generated by repeatedly sending a same idle symbol sequence. Therefore, having a write stream mode in which write streams are intermixed with pseudo random sequences of idle sequences may allow for improved communication.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Those skilled in the art will recognize that the boundaries between circuitry and blocks are merely illustrative and that alternative embodiments may merge functions or circuit elements or impose an alternate decomposition of functionality upon various blocks or circuit elements. Thus, it is to be understood that the architectures depicted herein are merely exemplary, and that in fact many other architectures can be implemented which achieve the same functionality.

Note that each of receiver 12 and transmitter 14 can be implanted on separate ICs. However, in one embodiment, a single IC can include both receiver and transmitter circuitry. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different encodings and corresponding decodings may be used to transmit and receive symbols. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a method of transmitting write stream data intermixed with idle sequences includes when a transmitter is in a write stream mode: transmitting write stream data symbols via the transmitter, wherein the write stream data symbols include valid data represented using a predefined set of data symbols; when valid data is unavailable to transmit, transmitting an idle symbol from the transmitter after transmitting one or more of the write stream data symbols, wherein the idle symbol is randomly selected from a predefined set of idle symbols that are distinct from the predefined set of data symbols. In one aspect, the method further includes when there is non-write stream data available to transmit during the write stream mode: transmitting a control symbol followed by non-write stream data symbols via the transmitter, wherein the control symbol belongs to one of a group consisting of the predefined set of idle symbols and a predefined set of control symbols. In another aspect, the write stream data symbols and the idle symbols are encoded using a first communication protocol. In a further aspect, the first communication protocol uses more bits in the write stream data symbols than a number of bits in each data word. In another further aspect, the method further includes encoding the data symbol using a second communication protocol to transmit the data symbol to a receiver; and encoding the idle symbol using the second communication protocol to transmit the idle symbol to the receiver. In another aspect the above embodiment, the idle symbol is transmitted to achieve a desired data rate. In yet another aspect of the above embodiment, the method further includes transmitting a read response control symbol and a limited number of read response data symbols by the transmitter in the write stream mode. In yet another aspect of the above embodiment, the method further includes transmitting two or more of the idle symbols between the data symbols to achieve a desired data rate. In a further aspect, the method further includes randomly selecting an idle symbol from the predefined set of idle symbols for each of the two or more of the idle symbols.

In another embodiment, a radio transmitter includes a data source; write stream circuitry coupled to the data source, wherein when a write stream mode is enabled, the write stream circuitry is configured to: when there is valid write stream data available from the data source, transmit one or more write stream data symbols to a receiver; when there is no valid write stream data available from the data source, transmit one or more idle symbols to the receiver, wherein each of the idle symbols is randomly selected from a set of at least two idle symbols. In one aspect, all idle symbols in the set of at least two idle symbols are distinct from the write stream data symbols. In another aspect, the radio transmitter further includes an encoder configured to encode: the valid write stream data to generate the one or more write stream data symbols, and the one or more idle symbols. In a further aspect, the radio transmitter further includes a data strobe encoder configured to encode the one or more write stream data symbols and the one or more idle symbols. In another further aspect, the encoder uses the 8b10b communication protocol. In another aspect of the another embodiment, the radio transmitter further includes in the write stream mode, the write stream circuitry is further configured to transmit a read response control word symbol and one or more read response data symbols between the write stream data symbols, wherein the read response control word symbol is distinct from the one or more idle symbols. In another aspect, the write stream circuitry is further configured to transmit the one or more idle symbols after the one or more write stream data symbols to fill a time period that achieves a specified data rate.

In yet another embodiment, a radio frequency (RF) transmitter includes write stream circuitry configured to: when a write stream mode is enabled: when valid write stream data is available for transmission, transmit a data symbol that includes the valid data encoded without a preamble, and when valid write stream data is not available for transmission and time remains in a time period associated with a data transmission rate for the RF transmitter, transmit an idle symbol in the time period, wherein the idle symbol is randomly selected from two or more idle symbols, wherein the idle symbol is encoded without a preamble. In one aspect, in the write stream mode, the write stream circuitry is further configured to: transmit a second idle symbol when additional time remains in the time period after the data symbol and the idle symbol are transmitted, wherein the second idle symbol is randomly selected from the two or more idle symbols, and the second idle symbol is different than the first idle symbol. In another aspect, in the write stream mode, the write stream circuitry is further configured to transmit a read response control word symbol and one or more read response data symbols between two data symbols, wherein the read response control word symbol is distinct from the one or more idle symbols. In yet another aspect, in the write stream mode, the write stream circuitry is further configured to transmit available non-write stream data before transmitting the idle symbol.

What is claimed is:

1. A method of transmitting write stream data intermixed with idle sequences, comprising:
   when a transmitter is in a write stream mode, transmitting a write stream, wherein the write stream is a non-ending symbol stream that has no ending until write stream mode is disabled, wherein transmitting the write stream comprises:
   transmitting write stream data symbols via the transmitter, wherein the write stream data symbols include valid data represented using a predefined set of data symbols;
   when valid data is unavailable to transmit, transmitting an idle symbol from the transmitter after transmitting one or more of the write stream data symbols, wherein the idle symbol is randomly selected from a predefined set of idle symbols that are distinct from the predefined set of data symbols.

2. The method of claim 1, further comprising:
   when there is non-write stream data available to transmit during the write stream mode:
   transmitting a control symbol followed by non-write stream data symbols via the transmitter, wherein the control symbol belongs to one of a group consisting of the predefined set of idle symbols and a predefined set of control symbols.

3. The method of claim 1, wherein:
   the write stream data symbols and the idle symbols are encoded using a first communication protocol.

4. The method of claim 3, wherein the first communication protocol uses more bits in the write stream data symbols than a number of bits in each data word.

5. The method of claim 3, further comprising:
   encoding the data symbol using a second communication protocol to transmit the data symbol to a receiver; and
   encoding the idle symbol using the second communication protocol to transmit the idle symbol to the receiver.

6. The method of claim 1, wherein the idle symbol is transmitted to achieve a desired data rate.

7. The method of claim 1, further comprising transmitting a read response control symbol and a limited number of read response data symbols by the transmitter in the write stream mode.

8. The method of claim 1, further comprising transmitting two or more of the idle symbols between the data symbols to achieve a desired data rate.

9. The method of claim 8, further comprising randomly selecting an idle symbol from the predefined set of idle symbols for each of the two or more of the idle symbols.

10. A radio transmitter, comprising:
a data source;
write stream circuitry coupled to the data source, wherein when a write stream mode is enabled, the write stream circuitry is configured to transmit a write stream, wherein the write stream is a non-ending symbol stream that has no ending until write stream mode is disabled, wherein the write stream circuitry is configured to, in transmitting the write stream:
when there is valid write stream data available from the data source, transmit one or more write stream data symbols to a receiver;
when there is no valid write stream data available from the data source, transmit one or more idle symbols to the receiver, wherein each of the idle symbols is randomly selected from a set of at least two idle symbols.

11. The radio transmitter of claim 10, wherein all idle symbols in the set of at least two idle symbols are distinct from the write stream data symbols.

12. The radio transmitter of claim 10, further comprising an encoder configured to encode:
the valid write stream data to generate the one or more write stream data symbols, and
the one or more idle symbols.

13. The radio transmitter of claim 12, further comprising a data strobe encoder configured to encode the one or more write stream data symbols and the one or more idle symbols.

14. The radio transmitter of claim 12, wherein the encoder uses the 8b10b communication protocol.

15. The radio transmitter of claim 10, further comprising:
in the write stream mode, the write stream circuitry is further configured to transmit a read response control word symbol and one or more read response data symbols between the write stream data symbols, wherein the read response control word symbol is distinct from the one or more idle symbols.

16. The radio transmitter of claim 10, wherein the write stream circuitry is further configured to transmit the one or more idle symbols after the one or more write stream data symbols to fill a time period that achieves a specified data rate.

17. A radio frequency (RF) transmitter comprising:
write stream circuitry configured to:
when a write stream mode is enabled, transmit a write stream, wherein the write stream is a non-ending symbol stream that has no ending until write stream mode is disabled, wherein the write stream circuitry is configured to, in transmitting the write stream:
when valid write stream data is available for transmission, transmit a data symbol that includes the valid data encoded without a preamble, and
when valid write stream data is not available for transmission and time remains in a time period associated with a data transmission rate for the RF transmitter,
transmit an idle symbol in the time period, wherein the idle symbol is randomly selected from two or more idle symbols, wherein the idle symbol is encoded without a preamble.

18. The RF transmitter of claim 17, wherein in the write stream mode, the write stream circuitry is further configured to:
transmit a second idle symbol when additional time remains in the time period after the data symbol and the idle symbol are transmitted, wherein the second idle symbol is randomly selected from the two or more idle symbols, and the second idle symbol is different than the first idle symbol.

19. The RF transmitter of claim 17, wherein in the write stream mode, the write stream circuitry is further configured to transmit a read response control word symbol and one or more read response data symbols between two data symbols, wherein the read response control word symbol is distinct from the one or more idle symbols.

20. The RF transmitter of claim 17, wherein in the write stream mode, the write stream circuitry is further configured to transmit available non-write stream data before transmitting the idle symbol.

* * * * *